United States Patent [19]

Böhmer et al.

[11] Patent Number: 4,588,772

[45] Date of Patent: May 13, 1986

[54] WATER-SOLUBLE, POLYMER-MODIFIED HYDROXYALKYL METHYL CELLULOSE AND ITS USE AS AN ADDITIVE FOR ASBESTOS-FREE TILE ADHESIVE FORMULATIONS

[75] Inventors: Branislav Böhmer, Walsrode; Werner Lange, Visselhoevede; Frank Höhl, Neuenkirchen, all of Fed. Rep. of Germany

[73] Assignee: Wolff Walsrode AG, Walsrode, Fed. Rep. of Germany

[21] Appl. No.: 664,906

[22] Filed: Oct. 26, 1984

[30] Foreign Application Priority Data

Nov. 4, 1983 [DE] Fed. Rep. of Germany ....... 3339860

[51] Int. Cl.[4] ................... C08B 37/00; C08B 7/352; C08B 7/354; C04B 11/22
[52] U.S. Cl. .............................. 525/54.23; 525/54.21; 523/457
[58] Field of Search .......... 525/54.23, 54.21; 523/457

[56] References Cited

U.S. PATENT DOCUMENTS

| | | | |
|---|---|---|---|
| 3,898,037 | 8/1975 | Lange et al. | 252/149 |
| 4,015,991 | 4/1977 | Persinski et al. | 524/5 |
| 4,028,290 | 6/1977 | Reid | 527/312 |
| 4,242,242 | 12/1980 | Allen | 524/547 |
| 4,330,441 | 5/1982 | Böhmer et al. | 525/54.21 |

Primary Examiner—John Kight
Assistant Examiner—Nathan M. Nutter
Attorney, Agent, or Firm—Sprung Horn Kramer & Woods

[57] ABSTRACT

Water-soluble substances of high molecular weight obtained by reacting hydroxyalkyl methyl celluloses with copolymers of 2-acrylamido-2-methyl-3-propane sulfonic acid/acrylamide/ethylacrylate and a bifunctional crosslinking component in an alkaline medium.

5 Claims, No Drawings

WATER-SOLUBLE, POLYMER-MODIFIED HYDROXYALKYL METHYL CELLULOSE AND ITS USE AS AN ADDITIVE FOR ASBESTOS-FREE TILE ADHESIVE FORMULATIONS

This invention relates to water-soluble substances of high molecular weight obtained by reacting hydroxyalkyl methyl celluloses with copolymers of 2-acrylamido-2-methyl-3-propane sulfonic acid/acrylamide/ethylacrylate and a bifunctional crosslinking component in an alkaline medium. Macromolecular substances such as these are eminently suitable for use as additives in asbestos-free tile adhesives.

Even today, asbestos is still a necessary additive for many tile adhesive formulations because the high thickening rate and swelling properties required and a reinforcing effect of the tile adhesive are obtained in this way. These properties are essential for guaranteeing the necessary stability, creep resistance and bond strength. However, since efforts are generally being made to replace asbestos, particularly in the building materials industry, there is a considerable need to provide tile adhesives which are at least equivalent, if not superior, to the asbestos-containing tile adhesives hitherto used. Surprisingly, this is possible by adding the macromolecular substances according to the present invention.

EP 0 014 258 already describes the production of water-soluble macromolecular substances by reacting cellulose derivatives with homopolymers or copolymers of acrylamide and, optionally, derivatives of acrylic acid and a crosslinking component, such as epichlorohydrin. Products such as these may also be used as additives in building materials, preferably in gypsum-based dry plaster. However, if these macromolecular substances are used as additives in tile adhesives formulations, it is found that the tile adhesives in question do not satisfy the necessary quality requirements in every respect.

It has none been found that it is possible to produce certain water-soluble substances of high molecular weight which do possess the necessary quality requirements.

Accordingly, the present invention provides water-soluble substances of high molecular weight obtained by:
(1) from reacting 85 to 97% by weight, preferably from 90 to 92% by weight of a hydroxy ($C_2$-$C_3$) alkyl methyl cellulose (HAMC) preferably having degrees of substitution $DS_M$ (DS=average substitution degree) of from 1.35 to 1.9 and $MS_{HP}$ (MS=molar substitution degree) of from 0.05 to 0.35 or $MS_{HE}$ of from 0.05 to 0.50,
(2) from 3 to 15% by weight, preferably from 8 to 10% by weight, of a copolymer of
 (a) from 30 to 75 mole percent, preferably from 40 to 70 mole percent, of 2-acrylamido-2-methyl-3-propane sulfonic acid (AMPS),
 (b) from 15 to 35 mole percent, preferably from 20 to 30 mole percent, of acrylamide (AAm) and
 (c) from 10 to 50 mole percent, preferably from 10 to 30 mole percent, of ethylacrylate units (EA), and
(3) from 0.2 to 1.2 moles per mole of polymer (2), preferably from 0.3 to 0.9 mole per mole of polymer (2) of a bifunctional crosslinking component, more especially epichlorhydrin,
the sum of (a) to (c) must be always 100 mol-%, in an alkaline medium in the form of an aqueous sodium hydroxide solution used in an alkaline quantity of from 19 to 3.08 g of NaOH per 100 g of HAMC, preferably from 2.08 to 2.98 g of NaOH/100 g of HAMC and, more preferably, from 2.28 to 2.78 g of NaOH/100 g of HAMC.

The present invention also relates to the use of the macromolecular substances produced in accordance with the invention as additives in asbestos-free tile adhesive formulations, preferably in quantities of at least 0.4% by weight and, more preferably, in quantities of at least 0.6% by weight, based on the formulation.

Component 1 used in accordance with the invention is preferably hydroxyethyl methyl cellulose (HEMC) or hydroxypropyl methyl cellulose (HPMC). It may be produced in batches, semicontinuously or fully continuously using known methods. For the modification reaction, it is taken from the production process, advantageously after the step in which the salt is washed out (the residual salt content must not exceed 3% by weight), and used in moist form. The moisture content of the HAMC is normally in the range from 45 to 70% by weight.

Although HAMC products having even lower water contents are also suitable, they may complicate the ready dispersion of the aqueous polymer solution. In order, nevertheless, to ensure effective contacting of the components, the polymer solution and/or sodium hydroxide should be used in a lower concentration.

HAMC products having higher water contents may also be used.

The hydroxyalkyl methyl celluloses modified in accordance with the invention should have degrees of substitution $DS_m$ of from 1.35 to 1.90, $MS_{HP}$ of from 0.05 to 0.35 and $MS_{HE}$ of from 0.05 to 0.50. In that case, the summary degree of substitution is in the range from 1.40 to 2.25 or from 1.40 to 2.40.

Particular significance is attributed to the $MS_{HA}$-substitution which should with advantage be in the range from 0.10 to 0.25.

An HAMC such as this used for modification in accordance with the invention has a dynamic viscosity in the form of a 2% aqueous solution at pH 7 (Rotovisko MVII D=2.55 sec$^{-1}$) in the range from 3000 to 40,000 mPa.s and preferably of the order of 10,000 mPa.s.

The copolymer used as component 2 for the modification according to the invention is preferably obtained by standard radical solution polymerization in deionized water using conventional initiators, such as potassium persulfate.

The monomers used may be added to the water either at the same time or successively. To obtain better dispersion of the monomers, the ethyl acrylate is mixed with a small quantity of an anionic surfactant. By adjusting a pH-value of around 1, by the graduated addition of $K_2S_2O_8$, by using a chain length regulator (hydroquinone) and by applying low temperatures, it is possible to avoid a violent reaction and, at the same time, to ensure the formation of terpolymers of relatively high molecular weight.

After polymerization, the product is present in the form of a 15 to 20% by weight aqueous solution. Products which have an intrinsic viscosity ($\eta$), as measured in 0.1N NaCl/dist. water at pH 3, of at least 4.0 and preferably $\geq 5$ are particularly suitable for the HAMC modificiations.

In addition to the above-mentioned monomers (a, b, c), other monomers may also be used for producing the terpolymer, at least one monomer selected from the following groups being copolymerizable in quantities of up to 10 mole percent:

monomers containing sulfonate groups: sodium vinyl sulfonate (NaVS), sodium-p-styrene sulfonate (NaSS), sodium-2-sulfoethyl methacrylate (NaSEMA), acrylic acid derivatives, such as methyl acrylamide (MAAm) or acrylonitrile (AN), ($C_1$–$C_6$) alkyl(meth)acrylates apart from ethyl acrylate or vinyl monomers, such as vinyl acetate (VAc), vinyl propionate (VPp).

Component 3 is preferably a known bifunctional crosslinking agent such as, for example, epichlorohydrin, although it is also possible to use the corresponding substituted bifunctional compounds, such as dichloro, diepoxy or monochloro/monoepoxy derivatives.

According to the invention, the quantitative ratio of component 3 to component 2 should be in the range from 0.2 to 1.2 mole of crosslinking agent to 1 mole of polymer or, expressed in mole percent, component 3 should be present in a proportion of from 16 to 55 mole percent. Despite the high proportion of crosslinking agent, substances readily soluble in water are obtained.

An alkaline reaction medium is necessary for producing the inventive products. The alkaline reaction medium preferably consists of NaOH because it activates the HAMC and, at the same time, acts as catalyst in the reaction of the epichlorohydrin with the two components 1 and 2. The sodium hydroxide is added in predetermined quantities before the modifying reaction. The total quantity of sodium hydroxide required for the modification reaction amounts to between 1.98 and 3.08 g of NaOH per 100 g of HAMC.

The NaOH may be added either to only one of the components or, preferably, separately to both components, i.e. the HAMC and the terpolymer. According to the invention, it is also of advantage to add different proportions of NaOH to components 1 and 2. Thus, the proportion of NaOH added to the synthetic, statistical terpolymer should generally be higher. In that case, the quantity of NaOH added should be between 0 and 30 g per 100 g of terpolymer and advantageously between 10 and 20 g per 100 g of terpolymer. The proportion of NaOH added to the HAMC should amount to between 0 and 2.6 g per 100 g of HAMC and, advantageously, to between 0.7 and 1.3 g per 100 g of HAMC.

The reaction components are advantageously combined in the following order: polymer, optionally with NaOH, and epichlorohydrin, and before addition to the HAMC are prepared in a suitable vessel capable of producing an adequate stirring effect. Thorough admixture at room temperature may be obtained using an autoclave equipped with a stirrer (for example an anchor stirrer).

Where production is carried out continuously or in batches on an industrial scale, mixing of the components may also be carried out in a static mixer.

The proportion of sodium hydroxide which is added to the HAMC should be directly added to the already homogenized HAMC shortly before the beginning of the modification reaction. This is done in the unit used for modification.

After adequate mixing of the HAMC/NaOH, the prepared polymer mixture is added. In this connection, the quality of mixing is particularly important. Thorough mixing and contacting of the components promotes the modification reaction.

Only those mixing units of the type in which the mixture of copolymer, NaOH and crosslinking agent is incorporated in thin layers in the HAMC by intensive mixing/kneading may be successfully used. On a laboratory scale, a laboratory kneader equipped with a beater plate may be successfully used.

A mixer for moist material of the type commonly used in the batch production of MC is *not* suitable for this purpose.

In the case of continuous production, it is possible to use a single-screw or twin-screw unit or a combination of the screws with squeezing or similar elements which provide for *intensive* mixing/contacting.

It is also of advantage, both for the mixing of the components and also for the subsequent modification reaction, to use the HAMC in a gelatinized state rather than in flocculated form. This state is only achieved below the flocculation point of the HAMC, preferably below 60° C.

The reaction temperature should be adjusted to between 60° C. and 95° C., the reaction preferably being carried out at temperatures in the range from 80° to 85° C.

The reaction product is then dried, normally at 90° to 150° C., in a drying cabinet or in a dryer of the type normally used in the production of methyl cellulose. Subsequent grinding and sifting to a particle size distribution of approx. 60%<63 $\mu$m and approx. 40%<180 $\mu$m and >63 $\mu$m are also carried out using standard laboratory and production units of the type used in the production of methyl cellulose.

PERFORMANCE TESTS

The performance of the modified hydroxyalkyl methyl celluloses produced in accordance with the invention is assessed by two semi-practical tests which enable practical assessment to be effectively simulated and which are also applied by the users of the tile adhesives, such as the creep test and a stability under load assessment test.

1. Creep test

Apparatus:
  200 ml polyethylene beaker (dimensions: D top=70 mm, D bottom=50 mm, H=70 mm)
  wooden stirrer (D=5 mm, B=15 mm, L=258 mm)
  burette or measuring cylinder (50 ml)
  stopwatch
  creep board
  comb-type spatula (tooth length 4 mm)
  stone tiles (100×100 mm, 200 g)
  3 kg weight
  needle
  ruler Tile Adhesive Mixture:
  40 parts of cement PZ 45 F (a product of Alsen-Breitenburg, Zement u. Kalkwerk GmbH)
  58.5 parts of quartz sand F-34 (a product of Quarzwerke GmbH, Frechen)
  1.5 parts of dispersion powder Elotex WS 45 ® (a product of Ebnother AG, Sempach-Station, Switzerland)

Types of Asbestos used (for assessment standard):
  Chrysotile 7 RF-1 (Supplier: Osthoff-Petrasch, Hamburg)
  Chrysotile 2023 (Supplier: Osthoff-Petrasch, Hamburg)

Methyl Cellulose Tile Adhesive used:
Walocel MW ® 10,000 PFV (a product of Wolff Walsrobe AG, Walsrode)

Procedure:

A thoroughly mixed tile adhesive mixture of asbestos and Walocel ® MW 10,000 or additive produced in accordance with the invention is introduced into a polyethylene beaker, water added (water/solids ratio 0.30), the stopwatch started,

| | |
|---|---|
| stirred for 1 minute (approximately 60 r.p.m.) | |
| leaved standing for 4 minutes | |
| stirred for 1 minute | total |
| leaved standing for 3.5 minutes | 10 minutes |
| stirred for 0.5 minute | |

Tile adhesive is applied to the lowered creep board and spread out (comb spatula held at 60°), applied (smooth side underneath) to the creep board, 3 kg weight applied in the middle and, in the meantime, a zero mark is drawn at the upper edge of the tile with the needle, the weight is removed, the board raised, the stopwatch stopped and creepage after 1, 3 and 5 minutes at the upper edge of the tile using the needle is marked.

Evaluation:
Measurement of the distances between the marks in (mm)
0–1 minute
0–3 minutes
0–5 minutes.

2. Test for Assessing Stability Under Load:

Apparatus:
200 ml polyethylene beaker
wooden stirrer (spatula)
burette or measuring cylinder (50 ml)
stopwatch
Tile Adhesive Mixture: Same as for the creep test.
Types of Asbestos used: Same as for the creep test
Standard Methyl Cellulose Tile Adhesive used: Same as for the creep test.

Procedure:

A thoroughly mix tile adhesive mixture of asbestos and Walocel ® MW 10,000 or additive produced in accordance with the invention is introduced into the polyethylene beaker, water added (water to solids ratio 0.31), stopwatch started, stirred for 1 minute (at approx. 60 r.p.m.). Most of the tile adhesive is removed from the beaker and applied to horizontally positioned wooden stir, stability under load in percent from the movement of the tile adhesive on the wooden stir against a standard is assessed, leaved standing for 4 minutes, stirred for 1 minute (at approx. 60 r.p.m.) most of the tile adhesive is removed from the beaker and applied to horizontally positioned wooden stirrer, stability under load in percent (after shearing) from the movement of the tile adhesive on the wooden stirrer is assessed.

Production of the Polymer (Component 2)

Polymer E:

92.3 g=0.4461 mole of 2-acrylamido-2-methyl-3-propane sulfonic acid (AMPS, Reaction grade as produced by the Lubrizol Corp., USA) are initially introduced into a 1 liter polymerization flask equipped with a stirrer, reflux condenser and an inlet pipe for inert gas.

446.6 g of deionized water are then introduced, after which 47.7 g of a 30% acrylamide solution (corresponding to 0.2008 mole) and then 13.4 g=0.1339 mole of ethyl acrylate are added to the solution. The concentration of the monomers in the water corresponds to 20% by weight.

These quantities of the monomers correspond to a molar ratio of AMPS:AA:EA of 1.0:0.45:0.30 or, expressed in mole percent, 57:26:17.

Throughout the entire preparation phase, the mixture of water+monomers in vigorously purged with nitrogen (passed through at a rate of approx. 20 $l.h^{-1}$). Thereafter, the residual oxygen content is advantageously between 1.2 and 1.8 ppm.

The addition of 0.66 g (0.11% by weight, based on the solution as a whole) of a surfactant, Genapol LRO ®, improves the distribution of the ethyl acrylate.

To mask the $Cu^{2+}$-ions present in the aqueous acrylamide solution and to shorten the induction period, Titriplex III (disodium salt of ethylene diamine tetraacetic acid) is added in a quantity of 0.419 g (0.35% by weight, based on monomer).

In addition, 0.01% by weight of hydroquinone, based on monomer, is added to regulate chain length.

A pH value of the order of 1 prevails in the reaction mixture. If the AMPS shows a neutral pH before production, it must be adjusted to the pH value of around 1 with hydrochloric acid.

After the additions have been made, the solution is stirred at around 400 r.p.m. and purged with approx. 10 $l.h^{-1}$ of nitrogen.

The reaction mixture is heated to 34° C.

30 minutes after that temperature has been reached, polymerization is initiated by the addition of 0.005% by weight of $K_2S_2O_8$ (corresponding to 0.006 g, based on the monomers).

After about 1 hour, there is an increase in viscosity. The reaction is completed by further additions of 0.01% by weight of the $K_2S_2O_8$ initiator after 1, 2, 4 and 6 hours and of 0.1% by weight after 9 hours.

The end of the reaction is ascertained by determining the residual monomer content.

The polymer solution formed is then diluted with water to a concentration of 15% by weight.

The end product obtained is characterized by the following data:

| | |
|---|---|
| pH-value = | 0.6 |
| concentration = | 14% by weight |
| rel. viscosity = (Haake VT 24) | 24,000 |
| intrinsic viscosity [η] = | 5.85 g.dl$^{-1}$ |

Other terpolymers A-Q as characterized in Table 1 are also produced by this process.

TABLE 1

| | Terpolymers | | | | | | |
|---|---|---|---|---|---|---|---|
| Code | AMPS (mole %) | AAM (mole %) | EA (mole %) | Concentration before and after the reaction (% by weight) | | Final pH-value | Rel. viscosity (Haake VT 24 Viskotester) | Intrinsic viscosity [η] (gdl$^{-1}$) |
| A | 75.0 | 15.0 | 10.0 | 25 | 15 | 0.5 | 14,000 | 4.5 |

TABLE 1-continued

| | | | | Terpolymers | | | | |
| | | | | Concentration before and after the reaction (% by weight) | | Final pH-value | Rel. viscosity (Haake VT 24 Viskotester) | Intrinsic viscosity [$\eta$] (gdl$^{-1}$) |
| Code | AMPS (mole %) | AAM (mole %) | EA (mole %) | | | | | |
|---|---|---|---|---|---|---|---|---|
| B | 68.6 | 20.0 | 11.4 | 20.2 | 15 | 1.0 | 21,000 | 4.3 |
| C | 61.5 | 28.2 | 10.2 | 20.0 | 15 | 0.6 | 28,000 | 6.1 |
| D | 51.5 | 17.9 | 20.5 | 20.2 | 15 | 0.6 | 20,000 | 5.1 |
| E | 57.1 | 25.7 | 17.1 | 20 | 14 | 0.6 | 24,000 | 5.8 |
| F | 57.1 | 25.7 | 17.1 | 20 | 15 | 0.6 | 41,000 | 7.1 |
| G | 51.6 | 22.5 | 25.8 | 20.1 | 15 | 0.9 | 32,000 | 5.2 |
| H | 45.7 | 31.4 | 22.8 | 20.1 | 15 | 0.7 | 43,000 | 5.4 |
| I | 40.0 | 30.0 | 30.0 | 25 | 15 | 1.0 | — | 6.1 |
| J | 30.0 | 30.0 | 40.0 | 25 | 15 | 1.6 | 82,000 | 9.0 |
| K | 30.0 | 20.0 | 50.0 | 25 | 15 | 1.8 | 26,00 | 4.7 |
| L* | 20.0 | 30.0 | 50.0 | 25 | 15 | 1.8 | partly gel-like | — |
| M* | 90.0 | 6.0 | 4.0 | 24.9 | 14.8 | 0.6 | 9,000 | 3.5 |
| N* | 15.0 | 85.0 | 0.0 | 24.6 | 14.8 | 0.6 | 11,000 | 4.2 |
| O* | 15.0 | 30.0 | 55.0 | 24.8 | — | cannot be measured, | | gel-like |
| P* | 0.0 | 45.0 | 55.0 | 24.7 | — | not fully reacted, approx. 50% residual monomer | | — |
| Q* | 10.0 | 40.0 | 50.0 | 20.0 | — | cannot be measured, | | — gel-like |

*denotes Comparison Examples

The most important characteristic data of the HAMC-types used in the modification according to the invention are shown in Table 2 below.

TABLE 2

| | | HAMC used | | | | |
| Type | Solids % | RT-MV II D = 2.55 sec$^{-1}$ viscosity $V_2$ (a · dry) (mPa · s) | NaCl— content % | DS$_M$1 | MS$_{HA}$2 | Second substituent |
|---|---|---|---|---|---|---|
| HAMC-1 | 45.7 | 9,230 | 2.1 | 1.73 | 0.10 | HP[3] |
| HAMC-2 | 41.0 | 13,200 | 2.9 | 1.44 | 0.15 | HP |
| HAMC-3 | 48.5 | 5,670 | 2.8 | 1.61 | 0.14 | HP |
| HAMC-4 | 36.7 | 7,100 | 2.8 | 1.49 | 0.08 | HP |
| HAMC-5 | 54.9 | 4,420 | 2.2 | 1.70 | 0.39 | HP |
| HAMC-6 | 41.7 | 11,730 | 2.4 | 1.40 | 0.23 | HE+ HP |
| HAMC-7 | 36.5 | 6,500 | 2.5 | 1.39 | 0.07 | HE[4] |
| HAMC-8 | 43.4 | 9,620 | 2.8 | 1.87 | 0.11 | HP |
| HAMC-9 | 41.5 | 9,490 | 2.7 | 1.57 | 0.12 | HP |
| HAMC-10 | 42.8 | 8,900 | 2.9 | 1.69 | 0.11 | HP |
| HAMC-11 | 42.3 | 8,040 | 2.0 | 1.57 | 0.10 | HP |
| HAMC-12 | 44.1 | 8,430 | 2.1 | 1.62 | 0.10 | HP |
| HAMC-13 | 51.1 | 3,100 | 2.3 | 1.83 | 0.47 | HE |
| HAMC-14 | 58.1 | 14,930 | 2.6 | 1.75 | 0.64 | HE |

[3]HP = hydroxypropy
[4]HE = hydroxyethoxy
1$_M$ = methoxy
2$_{HA}$ = hydroxyalkoxy

EXAMPLES 1 TO 20

Example 1

681.6 g of HAMC (degree of substitution DS=1.73, MS=0.10 and solids content 45.7% by weight) and 28.1 ml of 10% sodium hydroxide (corresponding to 1.0 g of NaOH/100 g of HAMC) are introduced into and kneaded for 15 minutes at room temperature in a laboratory kneader (LK) equipped with a beater plate.

At the same time, 220 g of the 15% by weight polymer are stirred with 15.5 ml of 25% NaOH (corresponding to 16 g/100 g of polymer) in a separate vessel, again for 15 minutes at room temperature. Thereafter, 8.0 g of epichlorohydrin as crosslinking agent (ratio of polymer to epichlorohydrin 66.7:33.3 mole percent) are stirred with the polymer for 15 minutes.

The mixture of polymer, NaOH and epichlorohydrin is then added to the HAMC in the kneader in a ratio of HAMC to polymer of 91:9. The temperature is then increased from about 25°–30° C. to 60° C. by heating the kneader for 30 minutes with continuous kneading.

The time at which the temperature of 60° C. is reached is regarded as the beginning of the modification reaction. The duration of the reaction is 2 hours at 60° C.

The product is then removed from the kneader, introduced on metal trays into a drying cabinet and dried for 3 hours at 150° C. The dried product is then ground in a Bauermeister laboratory mill and sieved to a particle size distribution of 60% <0.063 mm and 40% >0.063 mm and <0.180 mm.

The products thus produced, of which the starting components and production parameters are shown in Table 3, are tested in the same way as the asbestos-containing tile adhesives. The test results are shown in Table 4 and the comparison tests as standards for the asbestos-containing tile adhesive formulations in Table 5.

TABLE 3

| | | | | | | | | | Reaction | |
|---|---|---|---|---|---|---|---|---|---|---|
| Example No. | HAMC | Poly-mer | Ratio of HAMC:polym. (parts/parts) | Ratio of polym./Ep (moles/moles) | NaOH (g/100 g HAMC) | NaOH (g/100 g polym.) | Reaction unit | Heating-up/ mixing time (mins.) | time (mins.) | temp. (°C.) |
| 1 | HAMC-1 | E | 91:9 | 1.0:0.5 | 1.0 | 16.0 | LK | 30' | 120' | 60 |
| 2 | HAMC-1 | E | 91:9 | 1.0:0.5 | 0.9 | 16.0 | LK | 30' | 120' | 60 |
| 3 | HAMC-1 | E | 91:9 | 1.0:0.5 | 0.8 | 16.0 | LK | 30' | 120' | 60 |
| 4 | HAMC-1 | E | 91:9 | 1.0:0.5 | 1.0 | 15.0 | LK | 30' | 120' | 60 |
| 5 | HAMC-2 | E | 91:9 | 1.0:0.7 | 0.9 | 18.3 | LK | 30' | 120' | 60 |
| 6 | HAMC-1 | E | 91:9 | 1.0:0.5 | 1.1 | 14.0 | LK | 30' | 120' | 60 |
| 7 | HAMC-3 | E | 91:9 | 1.0:0.5 | 1.0 | 16.0 | WP-K | 20' | 120' | 60 |
| 8 | HAMC-3 | E | 91:9 | 1.0:0.3 | 0.7 | 16.0 | WP-K | 20' | 120' | 60 |
| 9 | HAMC-8 | G | 91:9 | 1.0:0.5 | 0.9 | 14.0 | LK | 40' | 120' | 60 |
| 10 | HAMC-4 | F | 91:9 | 1.0:0.6 | 0.9 | 18.3 | LK | 30' | 60' | 80 |
| 11 | HAMC-4 | F | 91:9 | 1.0:0.8 | 0.9 | 18.3 | LK | 30' | 120' | 60 |
| 12 | HAMC-6 | E | 91:9 | 1.0:0.5 | 1.0 | 16.0 | WP-K | 20' | 60 + 60' | 60 + 90 |
| 13 | HAMC-7 | E | 91:9 | 1.0:0.5 | 1.0 | 16.0 | WP-K | 20' | 60 + 60' | 60 + 90 |
| 14 | HAMC-10 | E | 91:9 | 1.0:1.0 | 1.0 | 16.0 | LK | 30' | 120' | 60 |
| 15 | HAMC-10 | E | 91:9 | 1.0:0.5 | — | 26.1 | LK | 30' | 120' | 60 |
| 16 | HAMC-10 | E | 91:9 | 1.0:0.5 | 2.58 | — | LK | 30' | 120' | 60 |
| 17 | HAMC-10 | E | 91:9 | 1.0:0.5 | 2.58* | — | LK | 30' | 120' | 60 |
| 18 | HAMC-10 | E | 91:9 | 1.0:0.5 | 0.7 | 16.0 | LK | 30' | 120' | 60 |
| 19 | HAMC-13 | E | 91:9 | 1.0:0.5 | 1.0 | 16.0 | LK | 20' | 60 + 60' | 60 + 90 |
| 20 | HAMC-12 | K | 91:9 | 1.0:0.5 | 0.8 | 15.0 | LK | 30' | 120' | 60 |

*Sodium hydroxide added after components 1, 2 and 3 have been mixed.

TABLE 4

Test results of the modified products

| Example No. | Tile adhesive mixture (g) | Modif. HAMC quantity (g) | Ratio of water to solids | Stability under load after stirring for 1 minute (%) | 5 minutes plus shearing (%) | Creepage after 1 min. (mm) | 3 mins. (mm) | 5 mins. (mm) |
|---|---|---|---|---|---|---|---|---|
| 1 | 100 | 0.65 | 0.31 | 100 | 100 | 0 | 0 | 0 |
| 2 | 100 | 0.65 | 0.31 | 100 | 100 | 0 | 0 | 0 |
| 3 | 100 | 0.65 | 0.31 | 100 | 100 | 0 | 0 | 0 |
| 4 | 100 | 0.65 | 0.31 | 100 | 97.5 | 0 | 0 | 0 |
| 5 | 100 | 0.65 | 0.31 | 100 | 100 | | | |
| 6 | 100 | 0.65 | 0.31 | 97.5 | 95 | | | |
| 7 | 100 | 0.65 | 0.31 | 100 | 100 | | | |
| 8 | 100 | 0.65 | 0.31 | 100 | 95 | | | |
| 9 | 100 | 0.65 | 0.31 | 100 | 95 | 0 | 0 | 0 |
| 10 | 100 | 0.65 | 0.31 | 100 | 97.5 | | | |
| 11 | 100 | 0.65 | 0.31 | 95 | 95 | | | |
| 12 | 100 | 0.65 | 0.31 | 100 | 97.5 | 0 | 0 | 0 |
| 13 | 100 | 0.65 | 0.31 | 100 | 97.5 | 0 | -1.0 | 1.5 |
| 14 | 100 | 0.65 | 0.31 | 100 | 95 | 2 | 3 | 3 |
| 15 | 100 | 0.65 | 0.31 | 97.5 | 95 | 1 | 1 | 1 |
| 16 | 100 | 0.65 | 0.31 | 100 | 95 | 4 | 9.5 | 14 |
| 17 | 100 | 0.65 | 0.31 | 95 | 90 | 15 | 40 | 80 |
| 18 | 100 | 0.65 | 0.31 | 100 | 97.5 | 1.5 | 2.5 | 2.5 |
| 19 | 100 | 0.60 | 0.30 | 100 | 97.5 | 0.5 | 1 | 2.5 |
| 20 | 100 | 0.65 | 0.31 | 100 | 97.5 | — | — | — |

TABLE 5

Test results with formulations containing asbestos as assessment standard

| No. of standard | Tile adhesive mixture (g) | Asbestos Chrysotile R 7RF-1 (g) | Walocel MW$^R$ 10.000 PFV (g) | Stability under load after stirring for 1 min. (%) | after "shearing" (%) | Creepage after 1 min. (mm) | 3 mins. (mm) | 5 mins. (mm) |
|---|---|---|---|---|---|---|---|---|
| 1 | 100 | — | 0.6 | 60 | 65 | 40 | 32.0 | 54.0 |
| 2 | 99.5 | 0.5 | 0.6 | 65 | 70 | 11.0 | 32.0 | 54.0 |
| 3 | 99.4 | 0.6 | 0.6 | 70 | 75 | 6.5 | 18.0 | 31.5 |
| 4 | 99.3 | 0.7 | 0.6 | 75 | 85 | 6.0 | 14.0 | 23.5 |
| 5 | 99.2 | 0.8 | 0.6 | 80 | 87.5 | 3.5 | 8.0 | 14.0 |
| 6 | 99.1 | 0.9 | 0.6 | 85 | 90 | 1.5 | 2.5 | 4.0 |
| 7 | 99.0 | 1.0 | 0.6 | 87.5 | 95 | 1.0 | 1.5 | 3.0 |
| 8 | 98.9 | 1.1 | 0.6 | 90 | 95 | 1.0 | 1.0 | 1.0 |
| 9 | 98.8 | 1.2 | 0.6 | 92.5 | 97.5 | 1.0 | 1.0 | 1.0 |
| 10 | 98.7 | 1.3 | 0.6 | 95 | 97.5 | 1.0 | 1.0 | 1.0 |
| 11 | 98.6 | 1.4 | 0.6 | 97.5 | 97.5 | 0 | 0 | 0 |
| 12 | 98.5 | 1.5 | 0.6 | 97.5 | 100 | 0 | 0 | 0 |

TABLE 5-continued

Test results with formulations containing asbestos as assessment standard

| No. of standard | Tile adhesive mixture (g) | Asbestos Chrysotile R 7RF-1 (g) | Walocel MW^R 10.000 PFV (g) | Stability under load after stirring for 1 min. (%) | after "shearing" (%) | Creepage after 1 min. (mm) | 3 mins. (mm) | 5 mins. (mm) |
|---|---|---|---|---|---|---|---|---|
| 13 | 98.4 | 1.6 | 0.6 | 100 | 100 | 0 | 0 | 0 |
| 1 | 100 | — | 0.6 | 60 | 65 | 40 | | |
| 14 | 99.9 | 0.1 | 0.6 | 65 | 70 | 13.5 | 42.0 | 80.5 |
| 15 | 99.8 | 0.2 | 0.6 | 70 | 80 | 3.5 | 8.5 | 15.5 |
| 16 | 99.7 | 0.3 | 0.6 | 80 | 90 | 1.5 | 1.5 | 1.5 |
| 17 | 99.8 | 0.4 | 0.6 | 85 | 92.5 | 0 | 0 | 0 |
| 18 | 99.5 | 0.5 | 0.6 | 95 | 95 | 0 | 0 | 0 |
| 19 | 99.4 | 0.6 | 0.6 | 97.5 | 100 | 0 | 0 | 0 |
| 20 | 99.3 | 0.7 | 0.6 | 100 | 100 | 0 | 0 | 0 |

We claim:

1. A water-soluble substance of high molecular weight obtained by reacting
   (1) from 85 to 97% by weight of a hydroxy ($C_2$–$C_3$) alkyl methyl cellulose.
   (2) from 3 to 15% by weight of a copolymer of
      (a) from 30 to 75 mole percent of 2-acrylamido-2-methyl-3-propane sulfonic acid,
      (b) from 15 to 35 mole percent of acrylamide and
      (c) from 10 to 50 mole percent of ethylacrylate and
   (3) from 0.2 to 1.2 moles per mole of component (2) of a bifunctional crosslinker component, in an alkaline medium consisting of NaOH used in a total quantity of from 1.98 to 3.08 g of NaOH per 100 g of HAMC.

2. A water-soluble substance according to claim 1 comprising 90 to 92% by weight of a hydroxy ($C_2$–$C_3$) alkyl methyl cellulose.

3. A water-soluble substance according to claim 1 comprising 8 to 10% by weight of said copolymer.

4. A water-soluble substance according to claim 1 comprising 0.3 to 0.9 mole per mole of component 2 of a bifunctional crosslinker component.

5. An asbestos-free tile adhesive formulation containing a water-soluble substance as claimed in claim 1.

* * * * *